United States Patent [19]
Bessette

[11] Patent Number: 5,803,511
[45] Date of Patent: Sep. 8, 1998

[54] ADAPTORS AND METHOD OF ATTACHING METAL BRAID REINFORCED CONVOLUTED METAL HOSES TO SUCH ADAPTORS

[75] Inventor: Arthur J. Bessette, Belchertown, Mass.

[73] Assignee: Titeflex Corporation, Springfield, Mass.

[21] Appl. No.: 832,601

[22] Filed: Mar. 31, 1997

Related U.S. Application Data

[63] Continuation of Ser. No. 453,670, May 30, 1995, abandoned.

[51] Int. Cl.$^6$ ....................................................... F16L 13/14
[52] U.S. Cl. ........................ 285/222.5; 285/382; 285/256
[58] Field of Search ..................................... 285/903, 256, 285/382, 222.5, 322.7; 29/508, 515

[56] References Cited

U.S. PATENT DOCUMENTS

| | | |
|---|---|---|
| 2,216,468 | 10/1940 | Farrar .................................. 285/256 X |
| 2,309,719 | 2/1943 | Vaill .................................... 285/256 X |
| 2,357,669 | 9/1944 | Lake ........................................ 285/149 |
| 2,556,544 | 6/1951 | Johnson ............................... 285/256 X |
| 2,848,254 | 8/1958 | Millar .................................. 285/256 X |
| 3,252,720 | 5/1966 | Waite ....................................... 285/256 |
| 3,307,589 | 3/1967 | Sheffield ............................. 285/149 X |
| 4,729,583 | 3/1988 | Lakikos et al. ...................... 285/256 X |
| 5,080,405 | 1/1992 | Sasa et al. . |
| 5,087,084 | 2/1992 | Gehring . |
| 5,094,482 | 3/1992 | Petty et al. . |
| 5,109,568 | 5/1992 | Rohn et al. . |
| 5,112,086 | 5/1992 | Gruber et al. . |
| 5,131,696 | 7/1992 | Sykes et al. . |
| 5,135,265 | 8/1992 | Bouscher et al. . |
| 5,145,215 | 9/1992 | Udell . |
| 5,150,930 | 9/1992 | Petty et al. . |
| 5,163,717 | 11/1992 | Wise . |
| 5,190,323 | 3/1993 | Oetiker ............................... 285/256 X |
| 5,201,554 | 4/1993 | Gagg et al. . |
| 5,232,251 | 8/1993 | Gaughan . |
| 5,261,707 | 11/1993 | Kotake et al. . |
| 5,263,747 | 11/1993 | Lefebvre et al. . |
| 5,267,757 | 12/1993 | Dal Palu . |
| 5,295,719 | 3/1994 | Dal Palu . |
| 5,299,841 | 4/1994 | Schaefer . |
| 5,308,123 | 5/1994 | Zorn . |
| 5,316,350 | 5/1994 | Kollenbrandt et al. . |
| 5,318,329 | 6/1994 | Suzuki et al. . |
| 5,364,135 | 11/1994 | Anderson ............................ 285/256 X |

FOREIGN PATENT DOCUMENTS

| | | | |
|---|---|---|---|
| 685353 | 4/1964 | Canada ................................. 285/256 |
| 1040026 | 8/1966 | United Kingdom .................. 285/256 |

Primary Examiner—Heather Shackelford
Attorney, Agent, or Firm—Mary R. Bonzagni, Esq.; Holland & Bonzagni, P.C.

[57] ABSTRACT

Metal braid reinforced convoluted metal hose assembly is provided where the metal braid is mechanically secured or cinched between an adaptor and or retainer and which demonstrates increased structural integrity in this interface area when compared to hose assemblies employing welded braid-to-adaptor attachments.

2 Claims, 1 Drawing Sheet

ADAPTORS AND METHOD OF ATTACHING METAL BRAID REINFORCED CONVOLUTED METAL HOSES TO SUCH ADAPTORS

This application is a continuation of application Ser. No. 08/453,670, filed on May 30, 1995, now abandoned.

FIELD OF THE INVENTION

This invention relates to adaptors and to a method of attaching metal braid reinforced convoluted metal hoses to such adaptors such that the resulting assembly demonstrates increased structural integrity in applications where severe operating conditions, such as intense vibration and extremely high temperatures, are encountered.

BACKGROUND OF THE INVENTION

Reinforced convoluted metal hose assemblies are used in numerous applications, including aerospace and land based applications (e.g., turbine fuel systems). Typical specifications for such applications require that these hose assemblies withstand pressure surges of internal fluids, long-term exposure to temperatures up to around 850° F., in addition to short term exposure to temperature surges or excursions up to around 1200° F. These hose assemblies are also required to withstand an extreme vibration environment.

The cumulative effect of the above-referenced events concentrates material fatigue at fixed locations along the metal hose with the most significant impact found at the hose/fitting interface. By way of example and explanation, when hose assemblies are subjected to high levels of vibration, where the vibration is amplified by a resonant response, the stress of such vibration is generally maximized at the hose/fitting interface, where the flexing body transitions into a relatively stiff and non-flexing body. As a result, the hose/fitting interface has been identified as a frequent site of failure.

Commonly assigned U.S. Pat. No. 5,263,747 to Lefebvre et al. addresses the inherent weakness problems of such hose/fitting interfaces by providing a weld adaptor 24 having an internal bore with a step formed therein that terminates in a radiused end. A convoluted metal hose 22 is welded to the adaptor 24 over a restricted length 36 of adaptor 24 which is remote from the radiused end. A reinforcing braid 40, which fits over the hose, is welded to the adaptor 24 at an end 42, while an outer collar or braid retainer 44 is welded to the adaptor 24 at end 42 as well. (See Col. 3, lines 21 to 30.) The unwelded radiused end is disclosed as fitting against and conforming to an outside contour on the convoluted hose. The hose is therefore free to roll and move against the rounded edge and, as a result, the bending forces are distributed along a length of the hose. Reportedly, this increase in intimate contact between the hose and the radiused end improves the reliability of the fitting and increases the life cycle of the hose.

However, such assemblies perform unsatisfactorily and, in particular, develop braid tears at the weld when subjected to heightened performance standards, for example, increased vibration in combination with increased dynamic flexing and pressure surging.

It is therefore an object of the present invention to provide a hose assembly that performs under heightened performance standards.

It is a more particular object of the present invention to provide a novel adaptor and a method for joining reinforcing braids of convoluted metal hoses to such adaptors.

SUMMARY OF THE INVENTION

The present invention therefore provides an adaptor, a method for securing or cinching a metal braid reinforcing layer of a convoluted metal hose between such an adaptor and a retaining means and the resulting hose assembly.

The adaptor of the present invention is for attaching end fittings to metal braid reinforced convoluted metal hose, where the hose has a first convolution having an outside diameter. The inventive adaptor has a bore with a diameter, a first end for attachment to end fittings, a radiused end that fits against and conforms to an outside contour of the first convolution of the metal hose, and at least one external friction enhanced bearing surface having a maximum outside diameter and having a total bearing surface area. The maximum outside diameter of the bearing surface(s) of the inventive adaptor is greater than or equal to the outside diameter of the first convolution of the metal hose. Moreover, when the bore diameter of the inventive adaptor measures from about 0.48 to about 3.18 centimeters (cm), the total bearing surface area of the external friction enhanced bearing surface(s) of the adaptor ranges from about 0.60 to about 2.79 square centimeters ($cm^2$).

In the present inventive method for securing or cinching a metal braid reinforcing layer of a convoluted metal hose between the above-described adaptor and a retaining means, a first length of a retaining ring, having an inside diameter, is positioned over a first length of the reinforcing layer positioned over the bearing surface(s) of the adapter, and the inside diameter of the first length of the retaining ring is mechanically reduced in size so as to secure or cinch the braid between the first length of the retaining ring and the bearing surface(s) of the adaptor.

The hose assembly of the present invention comprises:
a convoluted metal hose or innercore having outermost surfaces, and a first unconvoluted or straight section comprising: a first end, a first length beginning at the first end and a second length terminating at a first convolution;
an adaptor, as described hereinabove, located on the first unconvoluted section of the innercore;
a metal reinforcing layer located on the outermost surfaces of the innercore and having a first length positioned on the bearing surface(s) of the adaptor; and
a retaining ring having a first length positioned on the first length of the reinforcing layer,
where the adaptor is bonded to the first length of the first unconvoluted section of the innercore and where the first length of the reinforcing layer is secured or cinched to the bearing surface(s) of the adaptor by way of the pressure or retaining force exerted by the first length of the retaining ring.

DETAILED DESCRIPTION OF THE PREFERRED EMBODIMENTS

By the present invention, a hose assembly having improved burst strength is provided. The present invention eliminates the weld at the adaptor/wire braid interface and allows for the use of automated welding processes (e.g., orbital, electron beam, etc.) at the adaptor/hose interface. It has been determined that welding at the adaptor/wire braid interface melts the wire leaving the heat affected zone fully annealed. As a result, the strength of the bond at this interface, which represents a point of maximum stress in such an assembly, is compromised and is further diminished by inherent variations in manual welding operations.

Figure 1:
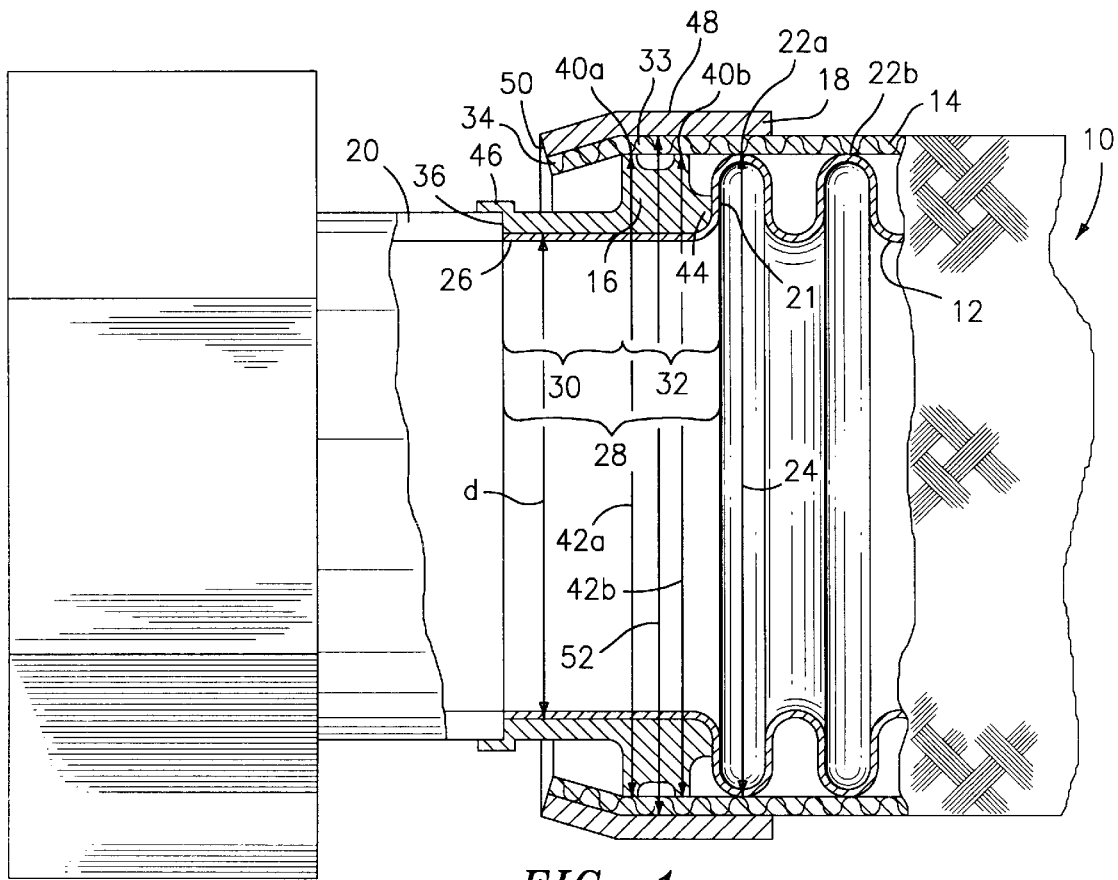
FIG. 1 is a longitudinal, partial cross-sectional view of a preferred hose assembly of the present invention.

Referring to the drawings in detail, the hose assembly of the present invention is shown generally at 10. Referring to FIG. 1, the hose assembly 10 is comprised of a convoluted metal hose or innercore 12, a metal reinforcing layer 14, an adaptor 16, and a retaining ring 18. Also shown in FIG. 1 is a rigid device 20 which serves to accept the convoluted metal hose 12, or the like, and may take the form of an end fitting, a pipe, or a collar on a larger device. Rigid device 20 serves as a vehicle by which convoluted metal hose 12 is connected to another structure, for example, a gas turbine.

The convoluted metal hose or innercore 12 has a first convolution 21 having an outside diameter 24, outermost surfaces 22a, 22b, a first end 26, and a first straight or unconvoluted section 28. The unconvoluted section 28 is made up of a first length 30, beginning at the first end 26, and a second length 32 terminating at the first convolution 21. The hose 12 can be made of any suitable metal material that can effectively accommodate a wide variety of non-aggressive and/or high temperature fluids, such as air, steam and exhaust gases. Such metal materials include carbon steel, copper, brass, aluminum, titanium, stainless steel, and nickel alloy, with the preferred materials being stainless steel and nickel alloy.

The metal reinforcing layer 14 is a loosely or tightly braided, woven or wound wire layer that contacts the outermost surfaces 22a, 22b, of the metal hose 12 and that has a first length 33 that extends over the adaptor 16 and unconvoluted section 28 of metal hose 12, terminating at a first end 34. The reinforcing layer 14 can be made out of any suitable metal and is preferably stainless steel.

The adaptor 16 makes a transition from rigid device 20 to the convoluted metal hose 12 and has: a first end 36; an internal bore having a diameter d; at least one external friction enhanced bearing surface 40a, 40b, having one or more surface grooves or depressions thereon, and a maximum bearing diameter 42, that is greater than or equal to the outside diameter 24 of the first convolution 21 of metal hose 12; and a flared or curved end 44. The first end 36 may employ a piloting device which serves to locate adaptor 16 exactly relative to the metal innercore 12. In FIG. 1, a weld consumable pilot ring 46 serves as such a piloting device, however, other devices, such as a butt weld "T-ring" may be employed instead. An inside diameter of rigid device 20 (not shown) is preferably smaller than diameter d of the internal bore of adaptor 16 by a step that is substantially equal to twice the wall thickness of metal hose 12, so as to enable the formation of a smooth and uninterrupted internal surface between rigid device 20 and metal hose 12. The flared or curved end 44 of adaptor 16 intimately contacts a curve or contour defined by the first convolution 21 of metal hose 12.

The adaptor 16 is bonded to rigid device 20 at the first end 36 and is bonded to metal hose 12 at the first length 30 of hose 12. It is preferred that such bonding be effected through any appropriate welding technique and more preferably through the use of an automated welding process.

The adaptor 16 of the present invention has sufficient structural integrity to resist deformation or collapse when exposed to bearing forces exerted by way of a securing or cinching process. In a preferred embodiment, where adaptor 16 has an internal bore having a diameter d of from about 0.48 to about 3.18 centimeters (cm), adaptor 16 will resist deformation or collapse when exposed to bearing forces or pressures (through retaining ring 18 and reinforcing layer 14) of less than or equal to 400 megapascals (MPa).

Contemplated materials for use in making adaptor 16 include carbon steel, copper, brass, aluminum, titanium, stainless steel, and nickel alloy with the preferred materials being stainless steel and nickel alloy. Such materials are available from Tube Sales, 2211 Tube Way, Los Angeles, Calif. 90040 under the product designation 321SS and from Jorgenson Steel & Aluminum, 1060 Silas Deane Highway, Wethersfield, Conn. 06109 under the product designation Inconel 625.

In one embodiment contemplated by the present invention (not shown), adaptor 16 has a plurality of bearing surfaces 40 that display a progressive increase in bearing diameters 42, with a maximum bearing diameter 42 being substantially equal to the outside diameter 24 of the first convolution 21 of metal hose 12.

In a more preferred embodiment, where adaptor 16 has an internal bore having a diameter d of from about 0.48 to about 3.18 cm, the total bearing surface area of bearing surface(s) 40a, 40b of adaptor 16 ranges from about 0.60 to about 2.79 square centimeters ($cm^2$). It has been found that if the total bearing surface area falls below this range the bearing forces exerted, to secure or cinch the first length 33 of reinforcing layer 14 between the bearing surface(s) 40a, 40b and the first length of the retaining ring, would result in the deformation or collapse of adaptor 16. Moreover, if the total bearing surface area exceeds this range the first length of the retaining ring would not exert sufficient pressure on the first length 33 of reinforcing layer 14 to render a viable connection.

Figure 2:
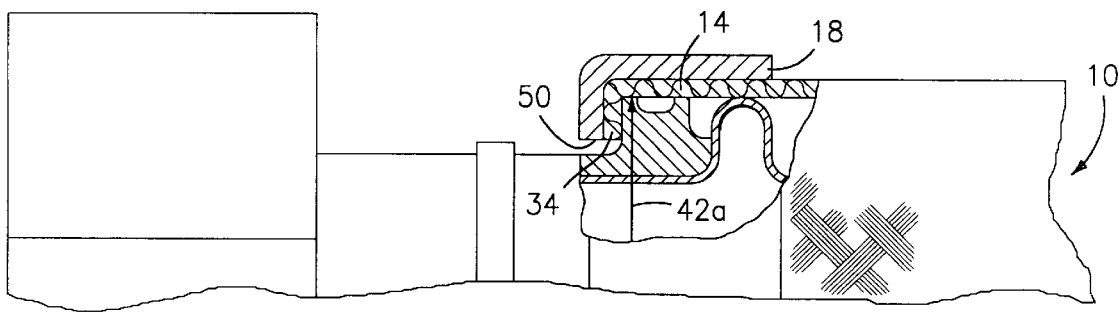
FIG. 2 is another partial cross-sectional view of another preferred hose assembly of the present invention showing a retaining ring further reduced in diameter at a first end.

The retaining ring 18 has a first length 48 that contacts and exerts pressure or retaining force on the first length 33 of reinforcing layer 14 and that terminates at a first end 50. The retaining ring 18 also has an inside diameter 52 approaching the maximum bearing diameter 42 and preferably extends beyond the first length 33 of reinforcing layer 14 in both directions. In a more preferred embodiment, retaining ring 18 extends beyond at least the first convolution 21 of metal hose 12, thereby providing a strain reliever to such convolution(s). In an even more preferred embodiment, and as best shown in FIG. 2, the first end 50 of retaining ring 18 is reduced in diameter to a diameter less than maximum bearing diameter 42, thereby providing additional pressure or retaining force on the first end 34 of reinforcing layer 14.

The retaining ring 18 can be made of any deformable material having a shape-retaining quality upon being mechanically reduced in size. Such materials include carbon steel, copper, brass, aluminum, titanium, stainless steel, and nickel alloy with the preferred materials being stainless steel and nickel alloy.

The method of the present invention basically comprises: positioning the first length 48 of retaining ring 18 over the first length 33 of reinforcing layer 14 and mechanically reducing the inside diameter 52 of retaining ring 18 so as to mechanically secure or cinch the first length 33 between the first length 48 and the bearing surface(s) 40a, 40b of adaptor 16. Any suitable forging operation capable of achieving close dimensional accuracy can be employed to effect mechanical reduction. The preferred operation is a "cold forming" operation. In practicing the present inventive method the first length 33 of reinforcing layer 14 is drawn over bearing surface(s) 40a, 40b and then retaining ring 18 is slid into position over the first length 33 and the bearing surface(s) 40a, 40b. The resulting assembly is then placed in any suitable crimping machine or device. The segmented jaws of the crimping device are then contoured or set to the desired final shape and diameter of the retaining ring 18. The segmented jaws are then closed, thereby effecting the permanent reduction in the diameter 52 of retaining ring 18 and thereby cinching the first length 33 of the reinforcing layer 14 into the bearing surface(s) 40a, 40b. The resulting assembly, which also employs welded connections at the first length 30/adapter 16 interface and at the first end 36 (e.g., at offset collar 46)/device 20 interface, provides more consistent and improved burst pressure test performance.

The present invention will be clarified by reference to the following illustrative working examples. The examples are not, however, intended to limit the generally broad scope of the present invention.

WORKING EXAMPLES

Sample Preparation

Four sizes of two types of hose assemblies were fabricated in an effort to compare the performance and integrity of the present inventive hose assembly (type "A") and the hose assembly disclosed in U.S. Pat. No. 5,263,747 (type "PA"). For both types of assemblies, four lengths of convoluted stainless steel hose or innercore, having wall thicknesses of 0.015, 0.02, 0.025 and 0.025 cm and maximum inside diameters of 0.65, 0.91, 1.23 and 1.91 cm, respectively, were employed. Eight sections of each size hose or innercore were cut with an abrasive wheel and the ends of each cut section were then modified with a crimper, Model P20C, available from Finn Power, U.S.A., Inc., 710 Remington Road, Schaumburg, Ill. 60173, to form unconvoluted or straight end portions measuring 0.88, 1.05, 1.08 and 1.05 cm in length for the respective hose sizes. Each modified section measured 30.5 cm in length. Stainless steel wire braid was then drawn over each modified section and two appropriately sized stainless steel retaining rings or locking collars were then positioned over the drawn braid. The retaining rings had inside diameters of 1.13, 1.57, 2.07 and 2.79 cm. The braid was then pushed back from each end and stainless steel adaptors having bearing surface areas of 0.84, 0.65, 0.91 and 1.05 cm$^2$ and bore diameters measuring 0.64, 0.95, 1.3 and 1.9 cm, respectively, were then employed. Pairs of appropriately sized adaptors having the same bore diameter were positioned on each unconvoluted end portion adjacent to a first convolution of each innercore. Manual welding techniques were then used to affix or secure a section of each unconvoluted end portion of each innercore to each adaptor. The wire braid was then pulled over the bearing surfaces of each adaptor and stainless steel end fittings having 37° seats (which mated with MS 33656) were then affixed or secured to each adaptor by welding the end fittings to the adaptors.

Type "A" Hose Assembly Preparation

Four samples each of assemblies or working examples 1 to 4, having adaptors with bore diameters measuring 0.64, 0.95, 1.3 and 1.9 cm, respectively, were prepared by subjecting each retaining ring to a mechanical crimping process using a crimper, Model P20C, which was capable of applying 1.2×10$^5$ kilograms (kg) force (max). During the mechanical crimping process, the inside diameter of each retaining ring was reduced to 1.06, 1.47, 1.94 and 2.69 cm respectively and a first end of the ring was shaped around the bearing surfaces of each adaptor.

Type "PA" Hose Assembly Preparation

Four samples each of assemblies or comparative examples C1 to C4, also having adaptors with bore diameters measuring 0.64, 0.95, 1.3 and 1.9 cm, respectively, were prepared by subjecting each retaining ring to a manual welding process. During the welding process, the wire braid ends were melted and incorporated into a puddle of weld material that served to attach the retaining ring, wire braid and adaptor.

TEST METHOD

Room Temperature Burst—ASTM D380

Each sample assembly was hydrostatically pressurized using a Proof Pressure and Burst Test Stand available from Flotron, Inc., South Windsor, Conn. Each assembly was pressurized to 3.45 MPa below the rated burst for the hose assembly size as set forth in Aerospace Standard AS 1424 issued Nov. 2, 1989 and published by the Society of Automotive Engineers, Inc. The pressure in each assembly was then increased at a constant rate of 0.69 MPa/minute until leakage or catastrophic failure occurred. Results are expressed in MPa.

EXAMPLES 1 TO 4 AND C1 TO C4

In these examples, the prepared hose assemblies were subjected to the room temperature burst test described hereinabove. The results, which represent an average of the four sample assemblies prepared for each working example, are displayed in TABLE I.

TABLE I

SUMMARY OF EXAMPLES 1 TO 4 AND C1 TO C4

| EXAMPLE | HOSE ASSEMBLY TYPE | ADAPTOR Nominal Diameter (cm) | ROOM TEMPERATURE BURST (MPa) |
|---|---|---|---|
| 1 | A | 0.64 | 59.6 |
| C1 | PA | 0.64 | 57.6 |
| 2 | A | 0.95 | 51.0 |
| C2 | PA | 0.95 | 49.6 |
| 3 | A | 1.3 | 41.4 |
| C3 | PA | 1.3 | 32.4 |
| 4 | A | 1.9 | 39.3 |
| C4 | PA | 1.9 | 29.6 |

Examples 1 to 4 demonstrate that the hose assemblies of the present invention, over the range of sizes employed, have increased overall structural integrity as compared to Examples C1 to C4, the hose assemblies of U.S. Pat. No. 5,263,747. Of note is that not only did Examples 1 to 4 fail at higher pressures, but failure mode changes were observed in that Examples 1 to 4 experienced failures as hose bursts and Examples C1 to C4 experienced failures as braid tears at the welds.

Although the invention has been shown and described with respect to detailed embodiments thereof, it would be understood by those skilled in the art that various changes from the detail thereof may be made without departing from the spirit and scope of the claimed invention.

Having thus described the invention, what is claimed is:

1. An adaptor, having a bore with a diameter, for attaching an end fitting to a metal braid reinforced convoluted metal hose, said hose having a first convolution having an outside diameter, wherein said adaptor comprises: a first end for attachment to said end fitting; a radiused end adapted to fit against and conform to an outside contour of said first convolution of said metal hose; and at least one external friction enhanced bearing surface, having a maximum outside diameter and having a total bearing surface area, wherein said maximum outside diameter of said bearing surface or surfaces is adapted to be greater than or equal to said outside diameter of said first convolution of said metal hose, wherein said diameter of said adaptor bore ranges from about 0.48 to about 3.18 centimeters; and wherein said total bearing surface area of said external friction enhanced bearing surface or surfaces of said adaptor ranges from about 0.60 to about 2.79 square centimeters.

2. A hose assembly, for conducting pressurized fluids therethrough, which is useful in applications where intense vibration and extremely high temperatures are encountered, and which consists essentially of:

a convoluted metal hose having outermost surfaces, a first convolution having an outside diameter, and a first unconvoluted section comprising a first end, a first length beginning at said first end, and terminating at said first convolution;

an end fitting;

an adaptor, having a bore with a diameter, which comprises: a first end for attachment to said end fitting; a radiused end that fits against and conforms to an outside contour of said first convolution of said metal hose; and at least one external friction enhanced bearing surface, having a maximum outside diameter that is greater than or equal to said outside diameter of said first convolution of said metal hose, and having a total bearing surface area;

a metal reinforcing layer located on said outermost surfaces of said convoluted metal hose and having a first length positioned on each of said bearing surfaces of said adaptor; and a retaining ring having a first length positioned on said first length of said reinforcing layer, wherein said first length of said retaining ring has an inside diameter substantially equal to said maximum outside diameter of each of said bearing surfaces of said adaptor and contacts and exerts pressure or retaining force on said first length of said reinforcing layer, thereby securing said first length of said reinforcing layer between said first length of said retaining ring and each of said bearing surfaces of said adaptor, wherein said adaptor is bonded or welded only to said first length of said first unconvoluted section of said metal hose and to said end fitting, and wherein said diameter of said adaptor bore ranges from about 0.48 to about 3.18 centimeters and wherein said total bearing surface area of said external friction enhanced bearing surface or surfaces ranges from about 0.60 to about 2.79 square centimeters.

* * * * *